US012301676B2

(12) United States Patent
Rad (10) Patent No.: US 12,301,676 B2
(45) Date of Patent: *May 13, 2025

(54) SYSTEM AND METHOD FOR MODIFYING A PREFERENCE

(71) Applicant: MATCH GROUP, LLC, Dallas, TX (US)

(72) Inventor: Sean Rad, Los Angeles, CA (US)

(73) Assignee: MATCH GROUP, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,337

(22) Filed: Aug. 22, 2022

(65) Prior Publication Data
US 2023/0231923 A1    Jul. 20, 2023

Related U.S. Application Data

(63) Continuation of application No. 14/927,789, filed on Oct. 30, 2015, now Pat. No. 11,425,213.

(60) Provisional application No. 62/073,073, filed on Oct. 31, 2014.

(51) Int. Cl.
G06F 16/24      (2019.01)
G06Q 30/02     (2023.01)
G06Q 50/00     (2012.01)
H04L 67/306    (2022.01)

(52) U.S. Cl.
CPC ............ *H04L 67/306* (2013.01); *G06F 16/24* (2019.01); *G06Q 30/02* (2013.01); *G06Q 50/01* (2013.01)

(58) Field of Classification Search
CPC ... H04L 67/306; G06F 16/24; G06F 3/04817; G06Q 50/01
See application file for complete search history.

(56) References Cited

U.S. PATENT DOCUMENTS

| D30,711 S | 5/1899 | Speakman |
| D430,120 S | 8/2000 | Yasui et al. |
| 6,480,885 B1 | 11/2002 | Olivier |
| 7,103,853 B1 | 9/2006 | Patil |
| D553,147 S | 10/2007 | Hally et al. |
| 7,743,100 B2 | 6/2010 | Cheah |
| D633,920 S | 3/2011 | Luke et al. |
| 7,917,448 B2 | 3/2011 | Smola et al. |
| D637,606 S | 5/2011 | Luke et al. |

(Continued)

OTHER PUBLICATIONS

Google Mobile Blog News and notes from the Google Mobile team, "The Iterative Web App: New Stacked Cards Interface for Gmail on iPad", http://googlemobile.blogspot.com/2010/08/iterative-web-app-new-stacked-cards.html, dated Aug. 2010, 3 pages.

(Continued)

*Primary Examiner* — Nicholas Klicos
(74) *Attorney, Agent, or Firm* — Baker Botts L.L.P.

(57) ABSTRACT

A method for profile matching includes receiving, from a first user, a first preference regarding a second user. The method includes receiving, from the second user, a second preference regarding the first user. The method also includes determining, based on the first preference and the second preference, to allow the first user to modify the first preference. The method also includes receiving, from the first user, a request to modify the first preference. The method also includes modifying the first preference.

10 Claims, 6 Drawing Sheets

(56) References Cited

U.S. PATENT DOCUMENTS

| | | |
|---|---|---|
| 8,060,463 B1 | 11/2011 | Spiegel |
| 8,180,804 B1 | 5/2012 | Narayanan et al. |
| D675,639 S | 2/2013 | Anzures et al. |
| D682,262 S | 5/2013 | Akana et al. |
| D682,301 S | 5/2013 | DiJulio et al. |
| 8,566,327 B2 | 10/2013 | Carrico et al. |
| D692,915 S | 11/2013 | Brinda et al. |
| D701,227 S | 3/2014 | Lee |
| D701,503 S | 3/2014 | Akana et al. |
| D726,759 S | 4/2015 | Brinda et al. |
| D732,049 S | 6/2015 | Amin |
| D738,394 S | 9/2015 | Chaudhri et al. |
| 9,171,084 B1 | 10/2015 | Skatell et al. |
| 9,798,832 B1 * | 10/2017 | Lessin .................. G06F 16/9024 |
| 2001/0046657 A1 * | 11/2001 | Dorn ..................... G09B 19/00 |
| | | 434/118 |
| 2003/0018797 A1 | 1/2003 | Dunning et al. |
| 2003/0043194 A1 | 3/2003 | Lif |
| 2003/0078976 A1 * | 4/2003 | Gordon .................. H04W 4/21 |
| | | 709/205 |
| 2004/0093334 A1 | 5/2004 | Scherer |
| 2004/0249811 A1 | 12/2004 | Shostack et al. |
| 2005/0021750 A1 | 1/2005 | Abrams |
| 2005/0027707 A1 * | 2/2005 | Syed ................... G06F 21/6245 |
| | | 707/999.009 |
| 2006/0059147 A1 | 3/2006 | Weiss et al. |
| 2006/0085419 A1 | 4/2006 | Rosen |
| 2006/0106780 A1 | 5/2006 | Dagan |
| 2006/0256959 A1 | 11/2006 | Hymes |
| 2007/0037574 A1 | 2/2007 | Libov et al. |
| 2007/0073687 A1 | 3/2007 | Terrill et al. |
| 2007/0073802 A1 * | 3/2007 | Terrill .................... G06Q 10/10 |
| | | 709/203 |
| 2007/0073803 A1 | 3/2007 | Terrill et al. |
| 2007/0286383 A1 * | 12/2007 | Fan ..................... H04M 3/4228 |
| | | 379/201.01 |
| 2008/0009263 A1 | 1/2008 | Pousti |
| 2008/0051033 A1 | 2/2008 | Hymes |
| 2008/0086534 A1 | 4/2008 | Bardak et al. |
| 2008/0147743 A1 | 6/2008 | Taylor et al. |
| 2008/0250332 A1 * | 10/2008 | Farrell .................. G06Q 10/10 |
| | | 709/204 |
| 2008/0294624 A1 | 11/2008 | Kanigsberg et al. |
| 2008/0301118 A1 | 12/2008 | Chien et al. |
| 2009/0106040 A1 | 4/2009 | Jones |
| 2009/0113006 A1 | 4/2009 | McWana |
| 2009/0144780 A1 * | 6/2009 | Toebes .................. G06F 16/335 |
| | | 725/87 |
| 2009/0271212 A1 * | 10/2009 | Savjani ............... G06Q 30/0207 |
| | | 705/14.1 |
| 2009/0307610 A1 | 12/2009 | Ryan |
| 2010/0145869 A1 | 6/2010 | Brown |
| 2011/0078247 A1 * | 3/2011 | Jackson .................. H04L 51/56 |
| | | 709/206 |
| 2011/0087974 A1 | 4/2011 | Kulas |
| 2011/0196927 A1 | 8/2011 | Vance |
| 2011/0219310 A1 | 9/2011 | Robson |
| 2011/0243533 A1 | 10/2011 | Stern et al. |
| 2011/0258065 A1 | 10/2011 | Fordyce, III et al. |
| 2011/0320320 A1 | 12/2011 | Dearlove et al. |
| 2012/0047267 A1 | 2/2012 | Mehr et al. |
| 2012/0290978 A1 * | 11/2012 | Devecka ............ G06Q 30/0273 |
| | | 715/810 |
| 2013/0067312 A1 | 3/2013 | Rose |
| 2013/0110731 A1 | 5/2013 | Wey |
| 2013/0167059 A1 | 6/2013 | Legris |
| 2013/0262984 A1 | 10/2013 | Mehr et al. |
| 2014/0040368 A1 | 2/2014 | Janssens |
| 2014/0156750 A1 * | 6/2014 | De Cristofaro ........ G06Q 50/01 |
| | | 709/204 |
| 2014/0207610 A1 | 7/2014 | Erez et al. |
| 2015/0039526 A1 | 2/2015 | Davidson |
| 2015/0066749 A1 | 3/2015 | Zdorovtsov |
| 2015/0089396 A1 * | 3/2015 | Song .................. G06Q 30/0619 |
| | | 715/753 |
| 2015/0128095 A1 | 5/2015 | Cheng |
| 2015/0334065 A1 | 11/2015 | Yan et al. |
| 2015/0381842 A1 | 12/2015 | Mori |
| 2016/0048537 A1 | 2/2016 | Epstein et al. |
| 2016/0104253 A1 | 4/2016 | Song et al. |
| 2016/0132607 A1 | 5/2016 | Skatell et al. |
| 2016/0179847 A1 | 6/2016 | Epstein et al. |
| 2016/0196337 A1 | 7/2016 | Epstein et al. |
| 2016/0248864 A1 * | 8/2016 | Loia ....................... G06Q 50/01 |
| 2017/0199920 A1 * | 7/2017 | Pearson .................. H04L 67/02 |

OTHER PUBLICATIONS

Duncan, Geoff, "Alas, HyperCard!", TidBITS Apple news for the rest of us, http://tidbits.com/article/5155, dated Nov. 1998, 5 pages.

* cited by examiner

SYSTEM AND METHOD FOR MODIFYING A PREFERENCE

PRIORITY

This application is a continuation, under 35 U.S.C. § 120, of U.S. patent application Ser. No. 14/927,789 filed on Oct. 30, 2015, and entitled "System and Method for Modifying a Preference" which claims priority to U.S. Provisional Patent Application No. 62/073,073 filed Oct. 31, 2014, both of which are hereby incorporated by reference in their entirety.

TECHNICAL FIELD

This disclosure relates generally to computer matching systems and more particularly to a system and method for modifying a preference.

BACKGROUND

Networking architectures have grown increasingly complex in communications environments. In recent years, a series of protocols and configurations have been developed in order to accommodate a diverse group of end users having various networking needs. Many of these architectures have gained significant notoriety because they can offer the benefits of automation, convenience, management, and enhanced consumer selections.

Certain network protocols may be used in order to allow an end user to conduct an online search of candidates to fill a given vacancy. These protocols may relate to job searches, person finding services, real estate searches, or online dating. While some believe that online dating is simply a matter of matching supply and demand, there is statistical and empirical evidence to suggest that successful online dating entails far more.

For example, people having similar and/or compatible character traits and values should be matched together. However, effectively linking two participants together can prove to be a challenging endeavor. Coordinating a relationship between two like-minded individuals can be a significant chore, as there are a number of obstacles and barriers that must be overcome.

One problem that has arisen is that matching services are limited to searching for matches only within their own platform. Thus, only people who have gone through the process of signing up for the service are searched for a match. One solution to this problem is to have users register in multiple services. This is problematic because it can be expensive and time consuming for users. Further, the user must then visit all of the services to monitor the search progress; this inefficiency may cause users to give up on the search process.

Another problem is that the search results of these services contain many irrelevant entities to the searcher. This costs the user of the service time and may deter them from continuing through all of the search results.

Another problem is that large numbers of unwanted communication requests can become a nuisance to the user. Too many nuisance requests may deter the user from further use of the system. Users with the most attractive profiles are oftentimes the ones that receive the most unwanted attention. If the users with the most attractive profiles cease to use the system, the quality of the user pool deteriorates.

SUMMARY

In one embodiment, a method for profile matching comprises receiving, from a first user, a first preference regarding a second user. It also comprises receiving, from the second user, a second preference regarding the first user. It further comprises determining, based on the first preference and the second preference, to allow the first user to modify the first preference. The method also comprises receiving, from the first user, a request to modify the first preference. It further comprises modifying the first preference.

In an embodiment, receiving the first preference regarding the second user comprises receiving a swiping gesture from the first user.

In an embodiment, A system for profile matching comprises at least one processor. The system also comprises computer readable medium. The system further comprises an interface. The system is configured to receive, from a first user, a first preference regarding a second user. The system is also configured to receive, from the second user, a second preference regarding the first user. The system is also configured to determine, based on the first preference and the second preference, to allow the first user to modify the first preference. The system is configured to receive, from the first user, a request to modify the first preference. The system is further configured to modify the first preference.

Depending on the specific features implemented, particular embodiments may exhibit some, none, or all of the following technical advantages. Some embodiments may be capable of allowing a user to modify a preference selection. A user may make a preference selection and regret the action. Thus, allowing a user to modify the preference selection is advantageous in that it allows users to modify the preference if they make a mistake or regret the initial decision. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts.

DETAILED DESCRIPTION

Figures 1A, 1B, 1C:
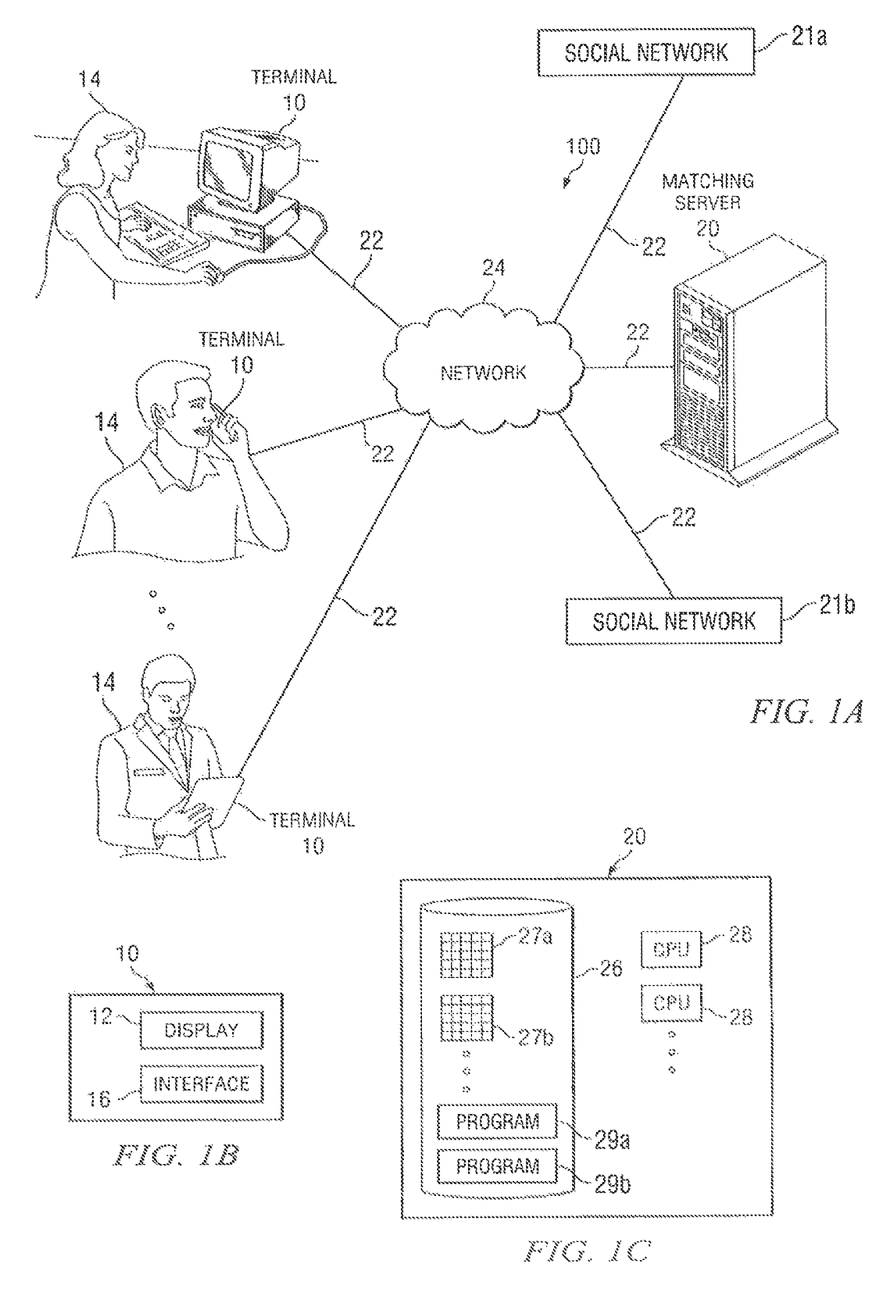
FIG. 1A is an overview of one embodiment of the matching system.
FIG. 1B shows one embodiment of the contents of a terminal from FIG. 1A.
FIG. 1C shows one embodiment of the contents of the matching server from FIG. 1A.

Referring to FIG. 1A, one embodiment of a matching system is shown. FIG. 1A is a simplified block diagram of a system 100 for facilitating matching (e.g., online dating) in a network environment. In other embodiments, system 100 can be leveraged to identify and to evaluate suitable candidates in other areas (e.g., hiring/employment, recruiting, real estate, general person searches, and other suitable scenarios where one entity is seeking to be matched with another entity). Users 14 may interact with social networks 21 and a matching server 20 through terminals 10. Terminal 10 and matching sever 20 are communicatively coupled via network connections 22 and network 24. In operation, in some embodiments, system 100 can allow a user 14 to express a preference for a potential matching candidate, such as a positive or negative preference. System 100 allows users 14 to modify the preference selection.

In some embodiments, users 14 are clients, customers, prospective customers, or entities wishing to participate in an online dating scenario and/or view information associated with other participants in the system. User 14 may also seek to access or to initiate a communication with other users that may be delivered via network 24. Users 14 may review data (e.g., profiles) associated with other users or items in order to make matching decisions or selections. Data, as used herein, refers to any kind of numeric, voice, graphic, video, text, script data, or any other suitable information in any appropriate format that may be communicated from one point to another.

In some embodiments, terminal 10 may be representative of a personal computer, an electronic notebook, a cellular telephone, an electronic tablet device, a laptop, a personal digital assistant (PDA), or any other suitable device (wireless or otherwise: some of which can perform web browsing), component, or element capable of accessing one or more elements within system 100. Interface 16, which may be provided in conjunction with the items listed above, may further comprise any suitable interface for a user such as a video camera, a microphone, a keyboard, a set of buttons, a mouse, a touch-sensitive display, a touch-sensitive area, or any other appropriate equipment according to particular configurations and arrangements. In addition, interface 16 may be an element or set of elements designed specifically for communications involving system 100. Such elements may be fabricated or produced specifically for matching applications facilitated by system 100.

FIG. 1B is a diagram showing, in one embodiment, the contents of terminal 10. Terminal 10 comprises interface 16 (so that user 14 may interact with terminal 10) and display 12. FIG. 1C is a diagram showing, in one embodiment, the contents of matching server 20. Matching server 20 comprises memory 26 and at least one CPU 28. Memory 26 may store multiple databases, such as databases 27a and 27b. In some embodiments, terminal 10 is operable to determine its own geographic location (e.g., using a global positioning satellite navigational system). As examples, terminal 10 may determine its own geographic location using one or more of: cellphone-based triangulation techniques, Wi-Fi positioning techniques, Global Positioning Satellite (GPS) system, network addresses assigned by a service provider, or other suitable methods of determining geographic location.

In some embodiments, display 12 can be implemented using one or more of: a computer monitor, a cellular phone display, a touch-sensitive screen, a projector, speaker, or other devices that allow a user 14 to appreciate information that system 100 transmits.

In some embodiments, network 24 is a communicative platform operable to exchange data or information within system 100. Network 24 could include a plain old telephone system (POTS). Network 24 could include or be any packet data network offering a communications interface or exchange between any two nodes in system 100. Network 24 can be implemented using a local area network (LAN), a metropolitan area network (MAN), a wide area network (WAN), a wireless local area network (WLAN), a virtual private network (VPN), an intranet, and/or any other appropriate architecture or system that facilitates communications in a network or telephonic environment, including a combination of any networks or systems described above. In various embodiments, network connections 22 may include, but are not limited to, wired and/or wireless mediums which may be provisioned with gateways, routers, and firewalls.

Matching server 20 is operable to receive and to communicate information to terminal 10. In some embodiments, matching server 20 may comprise a plurality of servers or other equipment, each performing different or the same functions in order to receive and communicate information to terminals 10 and/or social networks 21a-b. Matching server 20 may include software and/or algorithms to achieve the operations for processing, communicating, delivering, gathering, uploading, maintaining, and/or generally managing data, as described herein. Alternatively, such operations and techniques may be achieved by any suitable hardware, component, device, application specific integrated circuit (ASIC), additional software, field programmable gate array (FPGA), server, processor, module, erasable programmable ROM (EPROM), electrically erasable programmable ROM (EEPROM), or any other suitable object that is operable to facilitate such operations.

In some embodiments, matching server 20 includes memory 26 and at least one CPU 28. CPU 28 can be used to process information received from terminals 10, social networks 21a-b, memory 26, and/or any other suitable information source, or any combination of the proceeding. CPU 28 includes any suitable combination of hardware, firmware, and/or software that operates to control and process information. As examples, CPU 28 may be implemented using one or more of: a programmable logic device, a microcontroller, a microprocessor, a graphics processing unit, a central processing unit, an applications processing unit, or any other suitable processing device.

Memory 26 may include databases 27a-b and programs 29a-b. Memory 26 includes any one or a combination of volatile or non-volatile local or remote devices suitable for storing information. As examples, memory 26 may be implemented using one or more of: Random Access Memory ("RAM"), Read-only Memory ("ROM"), magnetic storage devices, optical storage devices, solid-state drives, or any other suitable information storage device or computer-readable media. Database 27 may contain a pool. The pool may include profiles that user 14 may view and for which user 14 may express a positive or negative preference. Memory 26 may also contain one or more programs 29a-b. Programs 29a-b may be executable computer code such as one or more of: source code, binary code, assembly code, machine code, scripts, or other suitable forms of instructions or commands that can be executed by a processor. CPU 28 executes one or more of programs 29a-b to implement functionality of matching server 20 such as those discussed herein.

In some embodiments, system 100 may also comprise one or more social networks 21*a-b*. System 100 may utilize any suitable number of social networks. In an embodiment, matching server 20 may be configured to allow users of social network 21*a* and/or social network 21*b* to interact with matching server 20. This integration can, in some embodiments, provide the advantage of users not having to learn and sign up for multiple platforms. Social networks 21*a-b* may each be, e.g., a service which stores profiles of its users or associated entities. FACEBOOK, LINKEDIN, and TWITTER are examples of services that may be represented by social networks 21*a-b*. Such services may be further configured to provide access to the stored profiles. For example, social network 21*a* may also allow other services (such as those provided by matching server 20 or social network 21*b*) to interact with users of social network 21*a* through interfaces or other suitable techniques provided by social network 21*a*.

In some embodiments, a user 14, using a terminal 10, registers with matching server 20. Registration may include user 14 submitting information to matching server 20 about user 14. Matching server 20 may also be configured to collect information about user 14 through one or more of social networks 21*a-b*. Matching server may create a profile for user 14 and store the profile in memory 26 (e.g., in database 27*a*).

In some embodiments, matching server 20 may be configured to allow its users to interact with one or more of social networks 21*a-b* through matching server 20. Matching server 20 may supplement its pool of profiles with information from social network 21*a-b*. Matching server 20 may be configured to generate profiles within matching server 20 from information received from social networks 21*a-b*; system 100 may be configured to do so through capabilities provided by social networks 21*a-b*, such as an application programming interface.

As an example of how system 100 may operate, consider two users 14: Harry, for whom matching server 20 has created a profile, and Sally, who has a profile stored in social network 21*a*. From within social network 21*a*, matching server 20 presents to Sally the ability to perform a search which Sally uses. The results of this search are presented to Sally within social network 21*a*. In this example, Harry's profile is displayed to Sally as a search result though Harry's profile was within matching server 20. In this example, matching server 20 may use any number of suitable algorithms and search through the profiles stored in matching server 20. In order to display Harry's profile to Sally, matching server 20 creates a profile using the data stored in Harry's profile. Sally is then able to interact with this newly created profile from within social network 21*a*.

In some embodiments, matching server 20 may import profiles from social networks 21*a* and/or 21*b*. As an example, this level of integration can provide the advantage of users only having to update and/or submit one or more aspects of their profile information in one place. For example, when user 14 updates his profile within social network 21*a*, matching server 20 is also able to access the updated profile information.

In some embodiments, matching server 20 may further be configured, as part of the user registration process, to link a user 14's profile to a profile in one or more of social networks 21*a-b*. Matching server 20 may be configured to analyze the profiles of the users within one or more of social networks 21*a-b* (e.g., collecting data and applying algorithms or analysis to that data). For example, matching server 20 may use information from social networks 21*a-b* such as common friends, common interests, common network, location, gender, sexuality, or age to evaluate potential matches between users 14. Matching server 20 may also use indications of preference made by a user 14 (e.g., expressions of approval and/or disapproval). Other forms of data and analysis used by system 100 may include facial recognition and/or detection of characteristics (such as ethnicity, hair color, eye color, or other suitable characteristics) of profiles that user 14 has expressed interest in. An advantage realized in various embodiments includes the capability of system 100 to present user 14 profiles based on information within social networks 21*a-b*.

In some embodiments, matching server 20 may have one or more of users 14 link to an existing profile within one or more of social networks 21*a-b*. This may provide the optional advantage of matching server 20 using authentication features provided by social network 21*a-b*. For example, false or incorrect information in a user profile may be less likely when the information comes from another source such as social network 21*a* or 21*b* (e.g., which may have verifiable and/or peer monitored information).

In some embodiments, an advantage of interacting with social networks 21*a-b* is that a user 14 has a wider pool of entities to search through. Another advantage is that a user 14 does not have to sign up with several social networks 21*a-b* to be matched with users on those networks.

Figure 2:
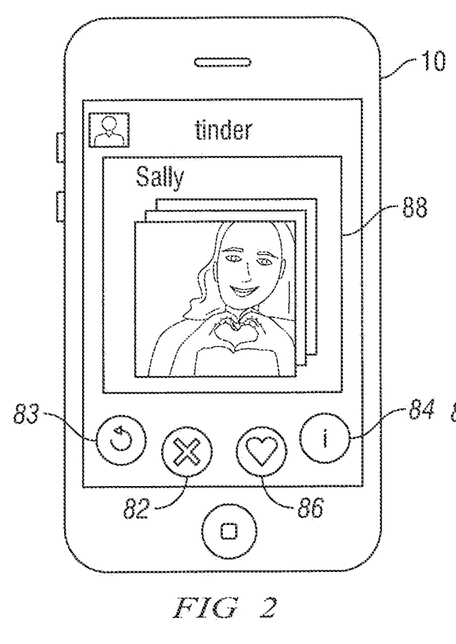
FIG. 2 shows one embodiment of a matching system displaying to a user profile information of a second user.

FIG. 2 shows one embodiment of system 100 displaying to a user 14 the profile information of another user. Matching server 20 may be configured to search through its plurality of profiles and present suggested matches to first user 14. In FIG. 2, one embodiment of this presentation is depicted as occurring through display 12 of terminal 10. In this embodiment, a plurality of user profiles are presented to user 14 (e.g., using a stack of cards as a visual representation of the profiles). Using terminal 10, user 14 may request that matching server 20 present a subset of users based on specified search parameters (e.g., age, sex, geographical location, or any other suitable parameter). Display 12 may show an image of a potential match and one or more aspects of the potential match's profile information. In some embodiments, the combination of image and one or more aspects of profile information is displayed using card 88 (a visualization of the profile) representing the suggested user. A set of suggested users may be displayed as stack of cards 88. User 14 may view information regarding one suggested user at a time or more than one of the suggested users at a time. User 14 may be presented with a summary of information regarding a suggested user. Various aspects of a profile may be included in the summary, such as one or more of: a picture, an icon, a name, location information, gender, physical attributes, hobbies, or any other suitable information included in a profile.

In some embodiments, terminal 10 may also display "information" button 84 which allows user 14 to request matching server 20 to retrieve and display more information about the presented profile. The additional information may include additional pictures, a user's biography, or any other suitable information. In addition, user 14 may express a preference, either approval or disapproval, for a presented user. Expressing approval or disapproval can be accomplished through various methods. For example, terminal 10 may display "like" button 86 (e.g., represented by a green heart icon) and "dislike" button 82 (e.g., represented by a red "X" icon). Pressing like button 86 indicates to matching server 20 that user 14 approves of and is interested in communication with the presented user. Pressing dislike button 82 indicates that user 14 disapproves of and does not want to communicate with the presented user. In some embodiments, a user 14 may express a preference by performing a swiping gesture in terminal 10 (e.g., swiping in one direction indicates a positive preference and swiping in another direction indicates a negative preference). In some embodiments, matching server 20 may keep private such preference indications made by user 14 such that other users of matching server 20 are not informed about such preference indications. In addition, terminal 10 may comprise "modification" button 83. Modification button 83 may be a virtual button displayed on display 10, a physical button located on terminal 10, or any other suitable type of button, switch, or toggle. As discussed below, modification button 83 may allow users 14 to modify their preference selection (e.g., "take back" or "undo" a preference indication).

As an example, consider two registered users, Harry and Sally, both of whom have profiles stored in matching server 20. Harry is at a restaurant and requests matching server 20 to present him users within a one-mile radius of his location. Matching server 20 compares a geographic position associated with Sally with a geographic position associated with Harry. If Sally is currently within the one-mile radius of Harry and matching server 20 determines her profile information matches Harry's preferences, matching server 20 will present Harry one or more aspects of Sally's profile information. If other users also meet the search criteria, matching server 20 will present one or more aspects of those users' profile information as well. Harry may request more information about Sally by pressing information button 84. Harry may also indicate his preference to communicate directly with Sally by selecting like button 86. In another example, Harry may expand his search to encompass a larger area (e.g., a twenty-five mile radius) to see other users that may be in his town, not just in the neighborhood in which he is currently located.

Figure 3:
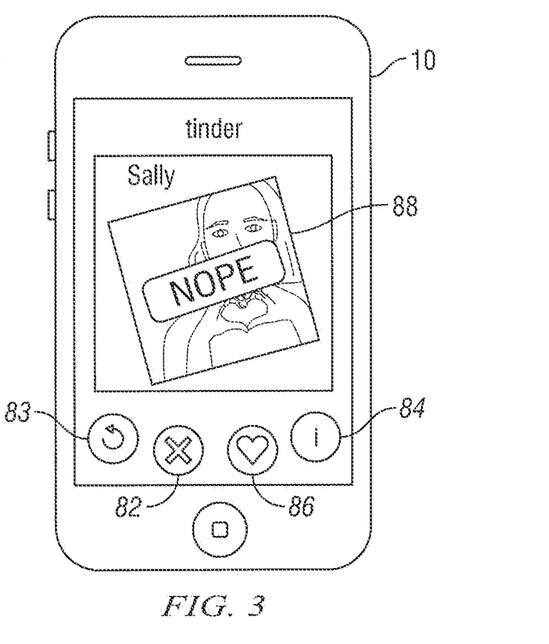
FIG. 3 is a diagram of one embodiment of the display of FIG. 2 showing the effect of a gesture.
Figure 4:
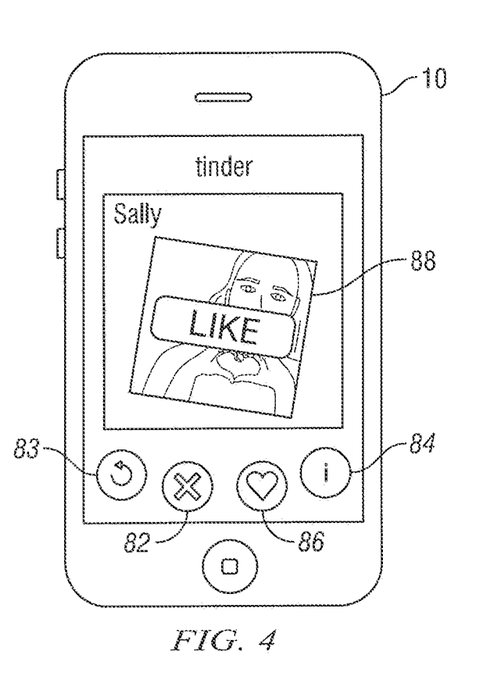
FIG. 4 is a diagram of one embodiment of the display of FIG. 2.

FIGS. 3 and 4 are diagrams of embodiments of the display after a preference indication is made. FIG. 3 shows the effect of making a negative preference indication (e.g., using button 82 and/or the user performing a swiping gesture moving to the left) and FIG. 4 shows the effect of making a positive preference indication (e.g., using button 86 and/or the user performing a swiping gesture moving to the right). In some embodiments, users 14 may navigate through the set of presented users by swiping through stack of cards 88. For example, when user 14 expresses a preference for a profile, another profile is automatically presented to user 14. Users 14 may also express approval of a presented user by performing a right swipe gesture or express disapproval by performing a left swipe gesture (or swiping any other suitable direction to indicate a preference). In some embodiments, user 14 performs a swiping gesture by moving a finger or other suitable object across a screen of terminal 10. Other suitable gestures or manners of interacting with terminal 10 may be used (e.g., tapping one or more times on one or more portions of a screen of terminal 10, shaking terminal 10 in one or more directions, or other suitable interactions).

In some embodiments, matching server 20 may generate a profile pool and determine an order to display the profile pool to user 14. As an example only, consider a situation where user 14 is interested in participating in an online dating scenario. User 14 may participate in a registration process in matching server 20. As part of the registration process, matching server 20 may ask user 14 a series of questions which identifies characteristics about user 14. Thus, matching server 20 may ask about the height, weight, age, location, and ethnicity of user 14. It may also ask about the birthplace, parents, eating habits, activities, and goals of user 14. Matching server 20 may further use the registration process to discover what user 14 may be looking for in a match, such as age, weight, height, location, ethnicity, diet, education, etc. Further, matching server 20 may ask user 14 to indicate how important certain factors are when looking for a match. For example, matching server 20 may allow the user to indicate which characteristics in a potential match are a necessity. In another example, matching server 20 may ask, "How important is it that your match does not smoke?" Matching server 20 may also allow the user to indicate that certain characteristics are not important search criteria. For example, when asking user 14 about what height or weight user 14 is seeking in a match, matching server 20 may be configured to receive "not important" as a response. In yet another example, matching server 20 may allow user 14 to rate which factors are important on a numerical scale. For example, matching server 20 may ask user 14 the following: "On a scale of 1-10, how important is it that your match has the same education level as you?" In some embodiments, matching server 20 may specify that any number of questions or requested descriptions are necessary before registration may be concluded. As an example only, matching server 20 may require that user 14 communicate the sex of user 14 and the sex user 14 prefers to be matched with. After concluding the registration process, matching server 20 may store the responses of user 14 as a profile. This same process may be repeated by several different users 14, causing matching server 20 to contain a plurality of profiles. In an embodiment, matching server 20 may utilize information within social network 21 to gather this information for user 14 or to gather additional information.

Matching server 20 may be configured to search through a pool of profiles and present profiles to user 14. In some embodiments, matching server 20 may be configured to generate a pool of candidates for matching by default according to various characteristics and preferences of user 14 and other users of the system. Matching server 20 may also restrict entities from being included in the pool based on the status of the profile, or if user 14 has rejected or blocked an entity. Matching server 20 may also restrict entities from the pool that have blocked or rejected user 14. For example, matching server 20 may not allow profiles that are not in good standing to be included in the pool. In some embodiments, matching server 20 may be configured to generate the pool by first choosing seeds. Seeds include, but are not limited to, profiles that user 14 has sent a message to or profiles that user 14 has expressed a preference for. Each seed is then compared to other profiles to determine which profiles will be display to user 14. Any suitable method can be used to determine which entities are included in the pool. For example, any characteristics or algorithms described herein may form the basis of such a determination.

In some embodiments, matching server 20 may be configured to include behavioral scales. These may include multi-item scales for materialism and gender-role traditionalism. Such scales may provide the advantage of improved matching through deeper appreciation for the personality of entities in the system.

In some embodiments, matching server 20 may be configured to analyze profile text for categories. It may search for a number of text strings and then associate the profile with any number of categories. As an example only, matching server 20 may add any profile to the Cat category whose text contains any of the following strings:

"cat" "cats" "cat." "cats." "cat," "cats,"

Matching server 20 may be configured to make it more likely that a profile will be displayed to user 14 if categories associated with the profile are also categories found in the user's profile who submitted the search request.

In one embodiment, matching server 20 may be configured to analyze the profiles of users 14 for keywords. Matching server 20 may be configured to search through the profile of users 14 for keywords that relate to things such as activities and interests. Matching server 20 may generate a score for a pair of users 14 based on a comparison between the list of keywords found in a first user's 14 profile and a second user 14's profile. In one embodiment, this is accomplished by storing a list of words in memory 26, and using it to identify keywords in the searched profiles. As an example only, a profile that contains the word "God" may be presented to a user 14 that has indicated that he/she is religious. In various embodiments, this may provide an advantage to user 14 in that user 14 is able to determine how similar he/she is with a potential match. In addition, the keyword analysis may be used by the system when searching and identifying matches for a user.

In another embodiment, matching server 20 may be configured to compare the locations of a first and second user 14. Matching server 20 may be configured to return all profiles within a certain radius of a user 14. This is advantageous because users that live further away are generally less appealing to a user.

In an embodiment, user 14 may select characteristics of profiles he or she wishes to view. For example, user 14 could choose a to view all females in the age range of 21-27 who are within 19 miles of the first user 14. Matching server 20, for example, could then communicate all profiles meeting the criteria user 14 through display 12 of terminal 10.

Figure 5:
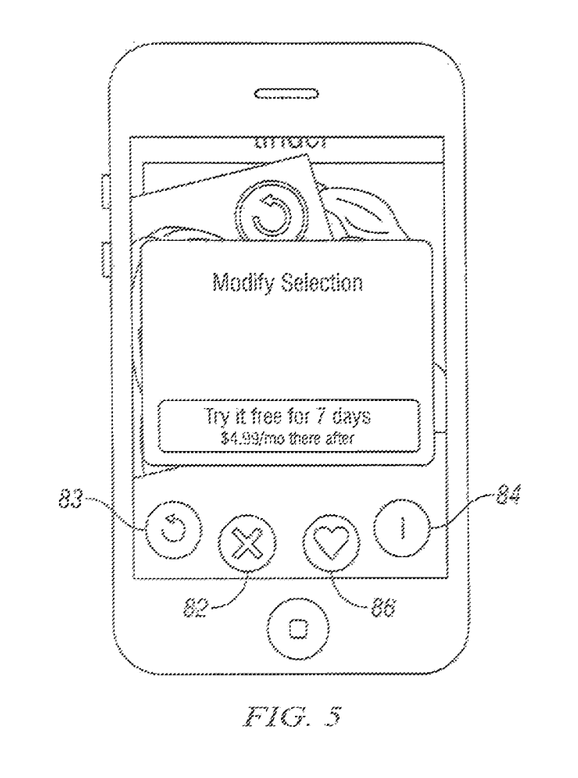
FIG. 5 shows one embodiment of the matching system displaying an option to modify a preference
Figure 6:
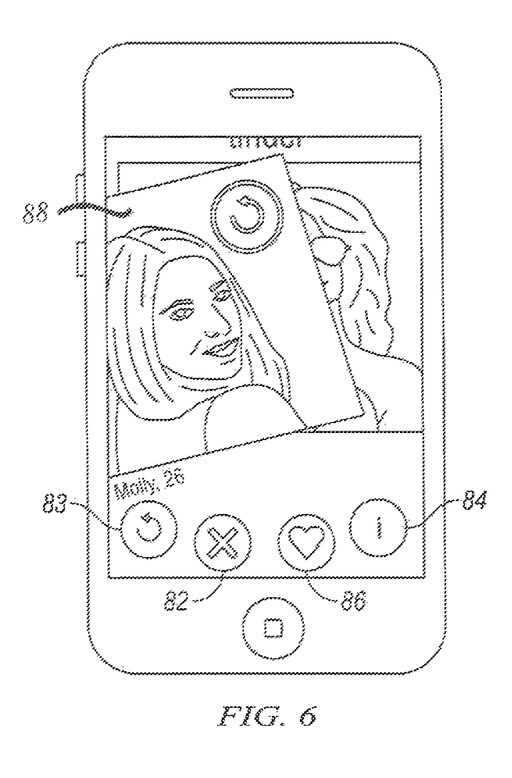
FIG. 6 shows one embodiment of the execution of a feature to modify a preference.

FIGS. 5 and 6 illustrate an embodiment of the operation of modification button 83. A user 14 may indicate a preference for a profile and decide to modify the action (e.g., because the user pressed the wrong button, swiped the wrong way, or changed his/her mind). Modification button 83 may allow user 14 to modify the preference selection. Modification button 83 may be made available in certain circumstances and not be made available (e.g., by making button 83 invisible or inactive) in other circumstances. For example, in some embodiments, user 14 may only utilize modification button 83 if the user 14 has paid a fee to activate the modification feature. As an additional example, in some embodiments, modification button 83 may only be available after a preference selection but before user 14 makes an additional preference selection. As a further example, modification button 83 may not be available if system 100 has determined there is a match and allows user 14 to communicate with the user represented by the matched profile. In one embodiment, the modification button 83 will be illuminated or colored if the modification feature is available and not illuminated or have a different color when the modification feature is unavailable (or vice versa).

In some embodiments, terminal 10 may display one or more sponsored profiles. For example, a person, group of people, or entity may sponsor a profile. A user may sponsor a profile by paying a fee, providing goods and/or services, or any other suitable method. In some embodiments, sponsored profiles may be displayed to users differently than regular profiles, such as being displayed sooner and/or more frequently. As another example, a sponsored profile may be displayed to one or more users that otherwise would not have been displayed to such users (e.g., due to selections made by such users or aspects of the profiles of such users) because the profile is a sponsored profile. Some users may not be presented with sponsored profiles. For example, users may pay to avoid being presented with sponsored profiles or pay to be presented with sponsored profiles less frequently. In some embodiments, a preference selection for a sponsored profile may not be modified. As an example, modification button 83 may not be made available to modify a preference selection for a sponsored profile. In other embodiments, a preference selection for a sponsored profile may be modified. In some situations, certain users may be allowed to modify a preference selection for a sponsored profile while other uses may not be allowed to modify a preference selection for a sponsored profile. For example, the users that are allowed to modify a preference selection for a sponsored profile may be users that have paid a fee, provided goods and/or services, or have been selected using any other suitable criteria.

FIG. 5 illustrates an embodiment of display 12 after user 14 indicates a desire to modify a preference selection. User 14 may interact with terminal 10 using one or more ways to indicate a desire to modify a preference selection including pressing modification button 83, swiping display 12 of terminal 10, shaking terminal 10, or any other suitable method. Once user 14 indicates a desire to modify a preference, display 12 may display options for the user 14 to modify a selection (e.g., by presenting a "window" or "card" interface with the options). Further, in some embodiments, if user 14 has not purchased a subscription to utilize the preference modification feature, the window may allow a user to purchase the feature (e.g., directly through terminal 10). In some embodiments, if the preference modification feature is not activated, pressing modification button 83 may have no effect. As another example, if the modification feature is not activated, a window may present users options to activate the feature.

FIG. 6 illustrates one embodiment of user 14 successfully modifying a preference selection. Once the user indicates the desire to modify a preference selection for a profile, system 100 may bring that profile card 88 to the top of the stack of cards 88. Then, user 14 may again express a preference for the profile. Further, if user 14 has yet to make a preference selection for the profile, pressing modification button 83 may do nothing or may cause options for activating the modification feature to be presented to user 14 (e.g., if user 14 has not activated the modification feature).

Figure 7:
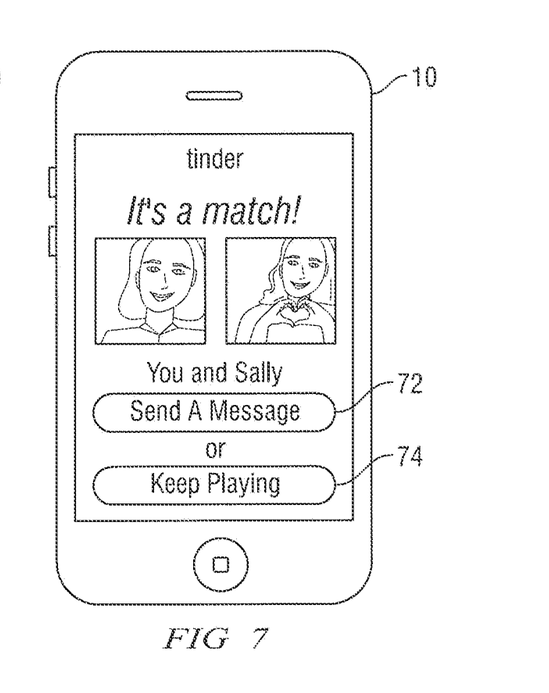
FIG. 7 shows the matching system displaying a match of a first user and a second user, in accordance with a particular embodiment.

In some embodiments, matching server 20 creates a match between users after they have each expressed a positive preference for each other's profiles (e.g., using "like" button 86 and/or a swiping gesture). When matching server 20 creates a match, it may also provide the matched users with the ability to contact each other (e.g., through a "contact" button). In some embodiments, when a match is created, matching server 20 may immediately (or soon thereafter) present an option to the users that have been matched to engage in a communication session (e.g., a chat, an SMS message, an e-mail, a telephone call, a voice communication session, and/or a video communication session).

FIG. 7 shows one embodiment of matching system 100 displaying a match of a first user and a second user. Matching server 20 may provide first user 14 and second user 14 with each other's contact information such as a telephone number or an e-mail address. Matching server 20 may also provide both first and second users 14 with a way to directly contact the other, such as sending a message or providing voice or video communication between the first and second user. In some embodiments, direct communication may be initiated by pressing "Send a Message" button 72. Alternatively, a user may choose to continue browsing the set of presented users by pressing "Keep Playing" button 74.

For example, user Harry may indicate a preference to communicate directly with user Sally by selecting like button 86. At this point, Sally is not aware that Harry expressed a preference for her. If Sally also requests matching server 20 present her with a set of possible matches, Harry may appear in her set. Sally may select like button 86 (or perform an associated swiping gesture) when viewing Harry's profile. Matching server 20 may then notify both Harry and Sally that a match occurred. At this point, both Harry and Sally are made aware that they each expressed approval of each other's profile. Matching server 20 then enables Harry and Sally to directly communicate with each other (e.g., through a private chat interface).

In some embodiments, one advantage of a system disclosing preferences of profiles to users when mutual approval has occurred is that a user can feel more secure in their privacy knowing that their preferences will be disclosed only to those that have expressed a preference for that user. As an example, a user can avoid embarrassment if their expression of preference for a profile was not reciprocated. This may lead to users more actively expressing their preferences. Such increased activity can be used by the matching system to generate more potential matches or better rankings of potential matches. In some embodiments, matching server 20 may be configured to allow direct communication between users when there has been a mutual expression of preference. This may be advantageous because users can avoid browsing, deleting, or responding to unwanted messages.

Figure 8:
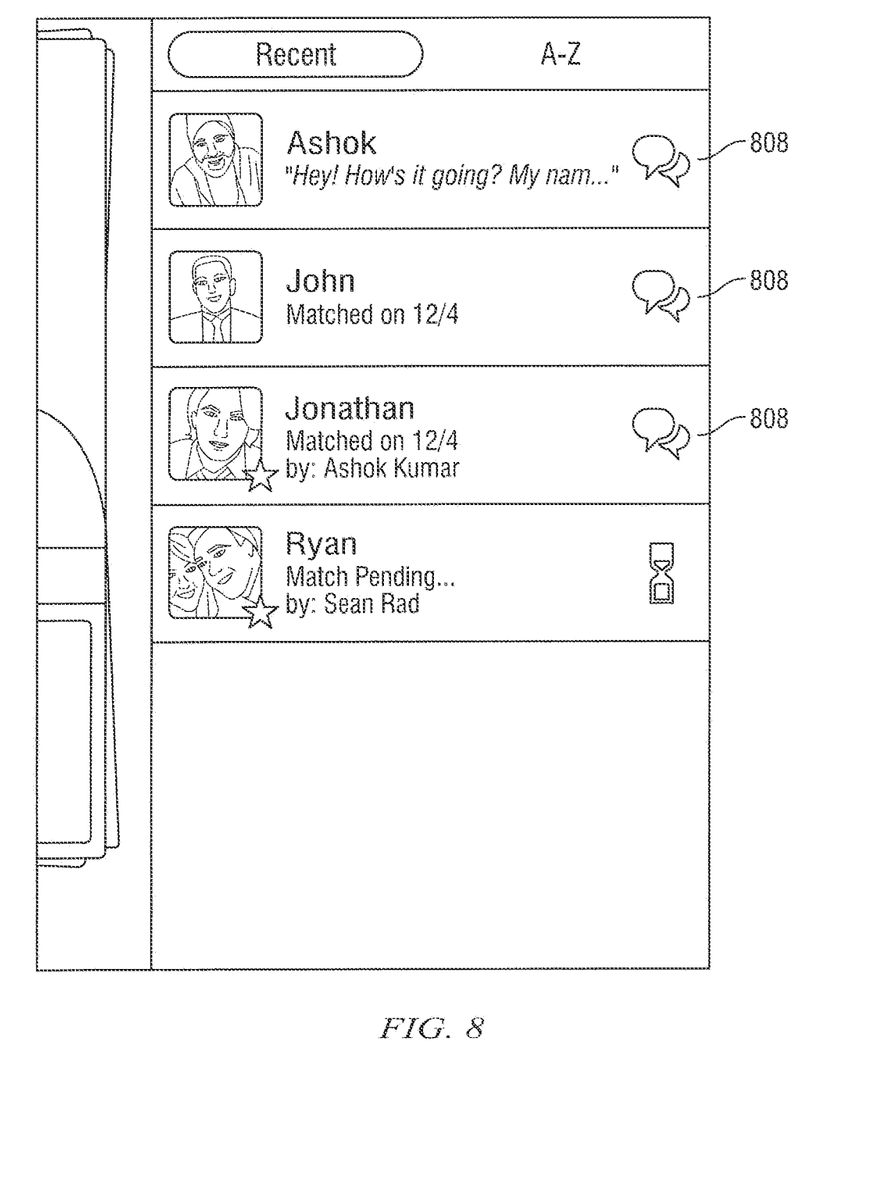
FIG. 8 depicts an embodiment of a user interface for communicating with users in the matching system.

FIG. 8 illustrates one embodiment of a communication interface between users of system 100. User 14 is presented with chat box 808 for each of the matched users that exist for user 14 and can communicate with them through chat box 808. In some embodiments, users 14 may communicate through one or more of: SMS messages, e-mail, telephone calls, online voice communication sessions, and/or video communication sessions.

Figure 9:
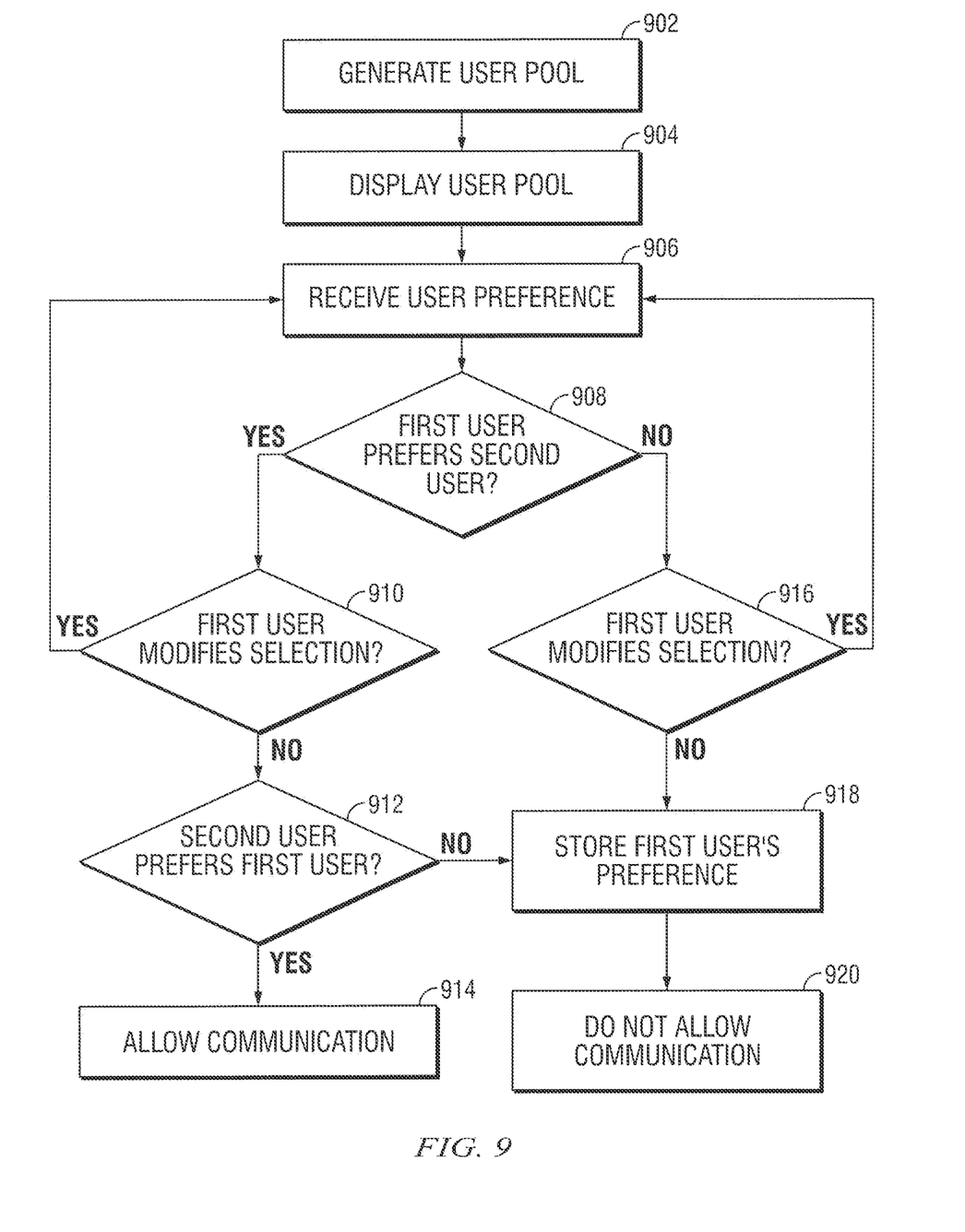
FIG. 9 is a flowchart depicting a method for enabling communication between two users based on a mutual expression of approval, in accordance with a particular embodiment.

FIG. 9 is a flowchart depicting a method for enabling communication between two users of matching system 100 based on mutual expression of approval, in accordance with a particular embodiment.

At step 902, in some embodiments, matching server 20 generates a set of user profiles in response to a request for matching from a user (e.g., a user 14). At step 904, matching server presents the set of user profiles to the user via terminal 10. Matching server 20 determines the contents and ordering of the set of user profiles by using, for example, a relevance algorithm based on certain aspects of a user's profile or by displaying user profiles randomly. For example, matching server 20 may include user profiles whose contents indicate location within a specified geographical radius and order the presentation of those user profiles based on the number of mutual friends in common with the first user.

At step 906, in some embodiments, matching server 20 receives an indication of a preference of the user regarding a presented user profile. Matching server 20 determines if the preference was an approval or a disapproval of the presented user profile at step 908. If disapproval of the presented user profile was expressed, the user is given the opportunity to modify the preference selection in step 916. If the user does not modify the indication of disapproval, then a match is not made. Matching server 20 may then store the preference in memory 26 in step 918 and not allow communication with second user 14 in step 920. If the user modifies the preference selection, then the method returns to step 906 where matching server 20 again receives the preference selection for the presented profile from the user.

In some embodiments, if the user expresses approval for the presented user profile at step 908, the user may be given the opportunity to modify the preference selection in step 910. If the user modifies the preference selection, then the method returns to step 906 where matching server 20 again receives the preference selection for the presented profile. If the user does not modify the preference selection, matching server 20 will determine if the entity represented by the presented profile has also expressed a preference for the user at step 912. If matching server 20 detects a mutual expression of approval, then a match is determined between the two users. If a mutual expression of approval is not detected at step 912, then matching server 20 stores the preference of the user regarding the presented under profile for future comparison and continues to step 920 where matching server 20 determines that communications are not yet allowed.

Figure 10:
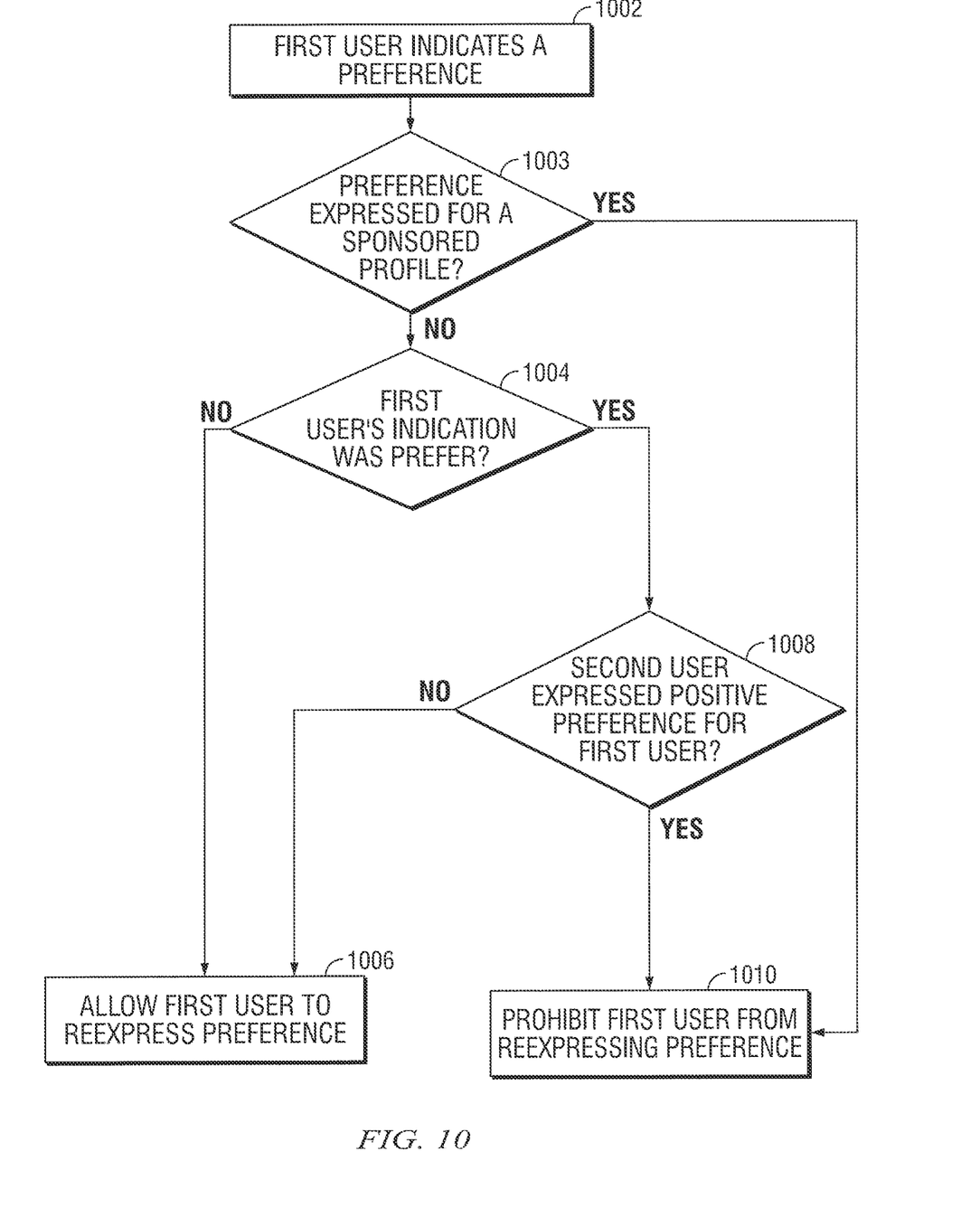
FIG. 10 is a flowchart depicting a method for modifying a preference, in accordance with a particular embodiment.

FIG. 10 is a flowchart depicting one embodiment of a method for modifying a preference. The method begins at step 1002 where, in some embodiments, a first user 14 indicates a preference, either approval or disapproval, of a second user 14's profile (e.g., by pressing a button or performing a swiping gesture).

The method then proceeds to step 1003 where system 100 determines whether the second user 14's profile is a sponsored profile. If system 100 determines that the second user 14's profile is a sponsored profile, the method proceeds to step 1010, where system 100 prohibits first user 14 from modifying the initial preference selection (e.g., by not making the modification feature available). If system 100 determines that the second user 14's profile is not a sponsored profile at step 1003, the method proceeds to step 1004. At step 1004, in some embodiments, first user 14 indicates a desire to modify the preference (e.g., by pressing modification button 83). System 100 determines whether first user 14's initial preference selection was approval at step 1004. If first user's initial preference selection not was approval, first user is allowed to go back and modify the preference selection at step 1006. If system 100 determines that first user 14's initial preference was approval in step 1004, the method proceeds to step 1008 where system 100 determines if second user 14 expressed a positive preference for first user 14. As discussed above, if both first and second users 14 express a positive preference for each other, there is a match. If system 100 determines that second user 14 expressed a positive preference for first user 14, then there is a match and the method proceeds to step 1010 where system 100 prohibits first user 14 from modifying the initial preference selection (e.g., by notifying the user that the modification feature is unavailable). However, if system 100 determines that second user 14 has not expressed a positive preference selection for first user 14 in step 1008, then the method proceeds to step 1006 where system 100 may allow first user 14 to modify the initial preference selection (e.g., by again presenting a card 88 to the user).

One advantage to this method is to allow user 14 to correct a mistake. The discovery process, as described in FIG. 9, may be so entertaining that users 14 may fall into a pattern of expressing preferences (e.g., swiping right several times in a row). User 14 may express a preference too quickly and immediately regret the action. This method allows user 14 to correct a mistake.

Modifications, additions, or omissions may be made to the methods described herein without departing from the scope of the disclosure. For example, the steps may be combined, modified, or deleted where appropriate, and additional steps may be added. For example, the system may not determine whether the second user 14's profile is a sponsored profile (hence, step 1003 may not be performed). As another example, in some embodiments, the system may allow a user to modify a preference if there is a match. Additionally, the steps may be performed in any suitable order without departing from the scope of the present disclosure.

Although several embodiments have been illustrated and described in detail, it will be recognized that substitutions and alterations are possible without departing from the spirit and scope of the appended claims.

What is claimed is:

1. An online dating system for profile matching, comprising:
   one or more processors operable to:
      receive, from a first terminal of a first user, a first indication submitted by the first user indicating a first preference regarding a second user;
      determine that at least one condition is met:
         the first preference is a negative preference for not initiating the communication for online dating with the second user, and
         the second user has not expressed a positive preference for the first user:
      based on determining that the at least one condition is met, determine that modifying the first preference by the first user is allowed
      and enable a modification button on a display associated with the first terminal of the first user for modification of the first preference; and
      based on receiving, from a second terminal associated with the second user, a second indication indicating a positive preference of the second user, remove the modification button from the display associated with the first terminal of the first user.

2. The online dating system of claim 1, wherein the one or more processors are operable to:
   receive a second indication from the first user, the second indication indicating a second preference for a third user; and
   determine that modifying the second preference is not allowed by determining that at least one of the following conditions is met:
      the second preference is a positive preference indication; and
      the third user has expressed a positive preference for the first user; and
   prohibit the first user from modifying the second preference.

3. The online dating system of claim 1, wherein the first indication is associated with a swiping gesture received from the first user via the display.

4. The online dating system of claim 1, wherein:
   a positive preference is indicated by swiping in one direction via the display of the first user or the second user, and
   a negative preference is indicated via swiping in another direction via the display of the first user or the second user.

5. A non-transitory computer-readable medium comprising computer code, the computer code, when executed by at least one processor, operable to:
   receive, from a first terminal of a first user, a first indication submitted by a first user indicating a first preference regarding a second user, the first indication received on an electronic device;
   determine that at least one condition is met:
      the first preference is a negative preference for not initiating communication for online dating with the second user, and
      the second user has not expressed a positive preference for the first user:
   based on determining that the at least one condition is met, determining that modifying the first preference by the first user is allowed
   and enabling a modification button on a display associated with the first terminal of the first user for modification of the first preference; and
   based on receiving, from a second terminal associated with the second user, a second indication indicating a positive preference of the second user, remove the modification button from the display associated with the first terminal of the first user.

6. The non-transitory computer-readable medium of claim 5, wherein the computer code is further operable to:
   receive a second indication submitted by the first user indicating a second preference regarding a third user, the second indication received on an electronic device;
   determine that modifying the second preference is not allowed by determining that at least one of the following conditions is met:
      the second preference is a positive preference indication; and
      the third user has expressed a positive preference for the first user; and
   prohibit the first user from modifying the second preference.

7. The non-transitory computer-readable medium of claim 5, wherein the first indication is associated with a swiping gesture received from the first user via the display.

8. An online dating method for profile matching, comprising:
   receiving, from a first terminal of a first user, a first indication submitted by a first user indicating a first preference regarding a second user, the first indication received on an electronic device;
   determining that at least one condition is met:
      the first user has expressed a negative preference for not initiating communication for online dating with the second user, and
      the second user has not expressed a positive preference for the first user:
   based on determining that the at least one condition is met, determining, by the one or more processors, that modifying the first preference by the first user is allowed
   and enabling a modification button on a display associated with the first terminal of the first user for modification of the first preference; and
   based on receiving, from a second terminal associated with the second user, a second indication indicating a positive preference of the second user, removing the modification button from the display associated with the first terminal of the first user.

9. The method of claim 8, further comprising:
   receiving a second indication submitted by the first user indicating a second preference regarding a third user, the second indication received on an electronic device;
   determining that modifying the second preference is not allowed by determining that at least one of the following conditions is met:

the second preference is a positive preference indication; and the third user has expressed a positive preference for the first user; and prohibiting the first user from modifying the second preference.

10. The method of claim 8, wherein the first indication is associated with a swiping gesture received from the first user via the display.

* * * * *